(12) United States Patent
Guan et al.

(10) Patent No.: US 11,761,374 B2
(45) Date of Patent: Sep. 19, 2023

(54) DAMPER DEVICE AND TOTAL HEAT EXCHANGER INCLUDING THE SAME

(71) Applicant: PANASONIC ECOLOGY SYSTEMS GUANGDONG CO., LTD, Guangdong (CN)

(72) Inventors: Shiyan Guan, Guangdong (CN); Zhenhong Yang, Guangdong (CN)

(73) Assignee: Panasonic Ecology Systems Guangdong Co., Ltd

(*) Notice: Subject to any disclaimer, the term of this patent is extended or adjusted under 35 U.S.C. 154(b) by 0 days.

(21) Appl. No.: 17/564,158

(22) Filed: Dec. 28, 2021

(65) Prior Publication Data
US 2022/0381179 A1  Dec. 1, 2022

(30) Foreign Application Priority Data

May 25, 2021 (CN) .......................... 202121131888.4

(51) Int. Cl.
*F01P 11/20* (2006.01)
*F01P 1/08* (2006.01)

(52) U.S. Cl.
CPC ................. *F01P 11/20* (2013.01); *F01P 1/08* (2013.01); *F01P 2070/52* (2013.01)

(58) Field of Classification Search
CPC .................................................. F01P 2070/52
See application file for complete search history.

(56) References Cited

U.S. PATENT DOCUMENTS

| 4,249,883 A * | 2/1981 | Woolfolk | F23L 11/005 236/1 G |
| 4,284,235 A * | 8/1981 | Diermayer | F23N 3/047 236/1 G |
| 4,460,121 A * | 7/1984 | Hedrick | F23N 3/047 236/1 G |
| 4,498,624 A * | 2/1985 | Kogut | F24D 5/00 237/53 |
| 2009/0084645 A1* | 4/2009 | Okabayashi | F16F 9/3242 188/266.6 |
| 2015/0034068 A1* | 2/2015 | Ishizaki | H05B 6/6479 126/285 R |
| 2016/0272041 A1* | 9/2016 | Yamashita | F16K 31/524 |
| 2019/0242595 A1* | 8/2019 | Eplee | F24F 13/30 |

* cited by examiner

*Primary Examiner* — Long T Tran
(74) *Attorney, Agent, or Firm* — Mendelsohn Dunleavy, PC

(57) ABSTRACT

A damper device and a total heat exchanger including the same are provided in the present application, including: a damper plate, including an air port cover plate, and a rotating shaft disposed at the air port cover plate and extending along a diameter direction of the air port cover plate; and a damper plate fixing base configured to fix the damper plate inside the damper plate fixing base and including a fixing groove formed opposite to the rotating shaft and configured to fix the rotating shaft, the fixing groove including a recess disposed opposite to the rotating shaft and formed by further being recessed from at least a part of the outer circumference of the fixing groove. According to the above technical solutions of the present application, the damper device can ensure performance without reducing the air volume under low temperature conditions, and can also suppress icing of the damper device.

10 Claims, 6 Drawing Sheets

DAMPER DEVICE AND TOTAL HEAT EXCHANGER INCLUDING THE SAME

CROSS-REFERENCE TO RELATED APPLICATION

The present application claims priority to Chinese Application No. 202121131888.4 filed on May 25, 2021, entitled "Damper Device and Total Heat Exchanger Including the Same", which is hereby incorporated by reference in its entirety.

TECHNICAL FIELD

The present application relates to the technical field of electrical appliances, in particular to a damper device, and more particularly to a damper device capable of suppressing icing while ensuring performance and a total heat exchanger including the same.

BACKGROUND

In the extremely cold winter, when a fresh air ventilator in the prior art is operating, a damper corresponding to an outdoor air inlet is opened, and outdoor cold air enters a case from the outdoor air inlet, causing the temperature in the case to decrease. When the damper is closed, hot and humid indoor air entering the case will produce water vapor as it cools, so that the water vapor adheres to a rotating shaft of the damper. When the damper is opened again, the outdoor cold air will condense the water vapor attached to the rotating shaft into ice, increasing the resistance to the rotation of the damper.

The situation is more likely to occur in a total heat exchanger with larger volume. Due to the larger volume, the damper is relatively larger, and ice formed by the water vapor attached to the rotating shaft brings greater resistance to the rotating shaft. The damper cannot be opened when the resistance is greater than the torque of the motor, which will affect the operation of the total heat exchanger.

In view of the above technical problems, it is necessary to provide a damper device capable of suppressing icing while ensuring performance and a total heat exchanger including the same.

BRIEF SUMMARY

(I) Technical Problems to be Solved

In a first aspect of the present application, a damper device capable of suppressing icing while ensuring performance is provided, so as to solve the technical problem that the damper has large resistance to rotation thereof and cannot even be opened due to the easy icing of the damper under low temperature conditions in the prior art.

In a second aspect of the present application, a total heat exchanger including the above-mentioned damper device is provided, so as to solve the technical problem that the damper has large resistance to rotation thereof and cannot even be opened due to the easy icing of the damper under low temperature conditions in the prior art.

(II) Technical Solutions

In order to solve the above technical problems, a damper device is provided in the present application, including: a damper plate, including an air port cover plate, and a rotating shaft disposed at the air port cover plate and extending along a diameter direction of the air port cover plate; and a damper plate fixing base configured to fix the damper plate inside the damper plate fixing base and including a fixing groove facing to the rotating shaft and configured to fix the rotating shaft, the fixing groove including a recess disposed opposite to the rotating shaft and formed by further being recessed from at least a part of an outer circumference of the fixing groove.

According to an embodiment, the damper plate fixing base has a hollow structure, and a hollow portion of the damper plate fixing base is formed with a mounting port for disposing the air port cover plate, and communicating with the fixing groove.

According to an embodiment, the rotating shaft includes a protrusion disposed on an end of the rotating shaft, the fixing groove further includes a protrusion-dedicated groove matching with the protrusion, and the protrusion rotates in the protrusion-dedicated groove when the rotating shaft rotates in the fixing groove.

According to an embodiment, the recess communicates with the mounting port.

According to an embodiment, two or more recesses are provided along an extension direction of the rotating shaft, a first retaining wall is provided between adjacent recesses, and a second retaining wall is provided between the groove and the protrusion-dedicated groove.

According to an embodiment, the damper device further includes an inserting port provided on an inner surface of the mounting port and configured to guide the rotating shaft to be inserted into the fixing groove.

According to an embodiment, the damper device further includes a stopper disposed outside the inserting port and covering a gap between the rotating shaft and the inserting port.

According to an embodiment, the damper plate fixing base includes an upper fixing base and a lower fixing base facing and connected to each other, and the fixing groove is formed by being recessed on a connecting surface between the upper fixing base and the lower fixing base.

According to an embodiment, the protrusion is provided to surround an outer circumferential surface of the rotating shaft so as to form an annular shape, or the protrusion is provided with one or more lumps or bumps on a part of the outer circumferential surface of the rotating shaft.

A total heat exchanger is further provided in the present application, including a case, in which an air-supply inflow space, an exhaust inflow space, an air-supply outflow space and an exhaust outflow space are provided to be separated from each other; an air-supply air inlet provided on the case and configured to communicate with the air-supply inflow space and allow outdoor air to enter the case; an air-supply air outlet provided on the case and configured to communicate with the air-supply outflow space and allow air entering the case to be blown out into indoor spaces; an air-supply air fan disposed inside the case and configured to guide the air from the air-supply air inlet into the case and to be blown toward the air-supply air outlet; an exhaust air inlet provided on the case and configured to communicate with the exhaust inflow space and allow indoor air to enter the case; an exhaust air outlet provided on the case and configured to communicate with the exhaust outflow space and allow the air entering the case to be blown out into outdoor spaces; an exhaust air fan disposed inside the case and configured to guide the air from the exhaust air inlet into the case and to be blown toward the exhaust air outlet; a heat exchange unit disposed inside the case, where the air-supply inflow space and the air-supply outflow space communicate with each other through the heat exchange unit to form an air-supply air path, the exhaust inflow space and the exhaust outflow space communicate with each other through the heat exchange unit to form an exhaust air path, and the air-supply air path and the exhaust air path exchange heat when passing through the heat exchange unit; and the above damper device disposed at the air-supply air inlet.

(III) Beneficial Effects

According to the above technical solution of the present application, the damper device and the total heat exchanger including the same can ensure performance without reducing the air volume under low temperature conditions, and can also suppress icing of the damper device.

REFERENCE NUMERALS

Figure 1:
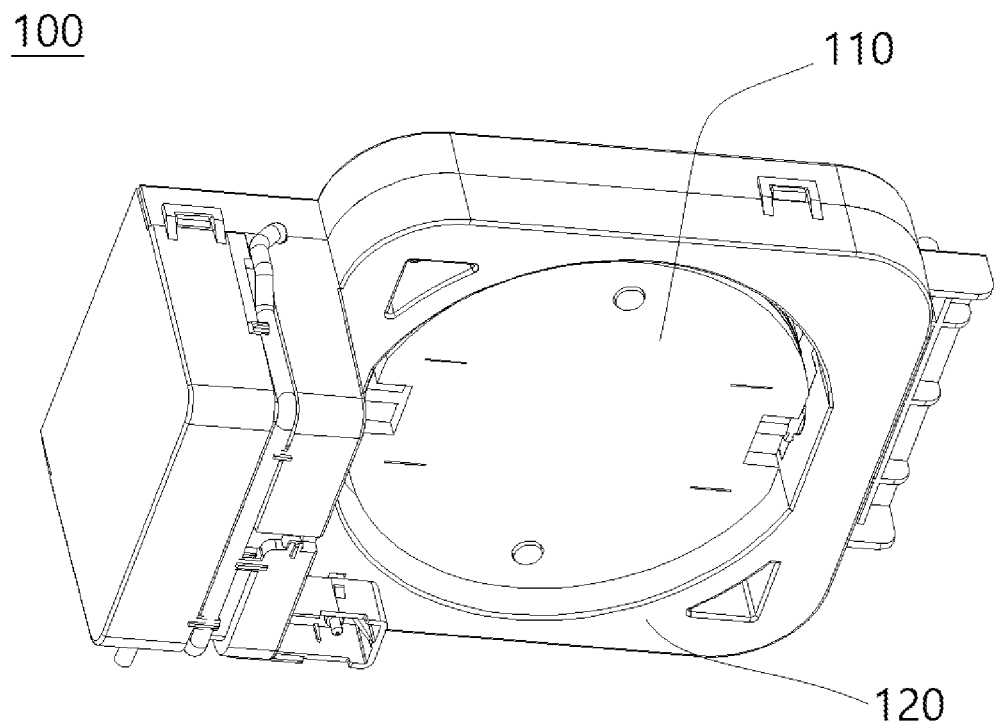
FIG. 1 is a schematic diagram showing a damper device according to a first embodiment of the present application.

100: damper device; 110: damper plate; 111: air port cover plate; 112: rotating shaft; 1121: protrusion; 1122: connecting portion; 120: damper plate fixing base; 121: upper fixing base; 122: lower fixing base; 123: mounting port; 124: fixing groove; 125: inserting port; 1241: protrusion-dedicated groove; 1242: recess; 1243: retaining wall; 1244: first recess; 1245: second recess; 1246: first retaining wall; 1247: second retaining wall; 130: motor; 140: stopper; 200: total heat exchanger; 210: case; 220: air-supply air inlet; 230: air-supply air outlet; 240: exhaust air inlet; 250: exhaust air outlet; 260: heat exchange unit; 271: air-supply inflow space; 272: exhaust inflow space; 273: exhaust outflow space; 280: circulation air port.

DETAILED DESCRIPTION

In order to explain the objectives, technical solutions, and advantages of the present application more clearly, the present application is further described below in detail in conjunction with specific embodiments and with reference to the accompanying drawings. In addition, the following embodiment is only one of the specific examples of the present application, and does not limit the technical scope of the present application.

In the drawings, the second description of the same components with the same reference numerals and the descriptions of components not directly related to the present application will be omitted or simplified. In the following description, all orientation words such as "upper", "lower", "left", "right", "top", and "bottom" are described based on the state shown in the figures of the damper device in the embodiments of the present application. In addition, in the following description, all orientation words such as "upstream side" and "downstream side" are defined with reference to the direction in which the air flows in the case.

The following orientation or positional relationships are merely for the convenience of describing the present application and simplifying the description, rather than indicating or implying that the device or component stated must have a particular orientation, be constructed and operated in a particular orientation, and thus are not to be construed as limiting the present application. Moreover, the terms "first", "second", "third", and the like are used for descriptive purposes only and are not to be construed as indicating or implying relative importance.

The damper device in the present application is a device that is disposed on the downstream side of an outdoor air inlet and used to open or close the outdoor air inlet. The switching between opening and closing the damper device is not limited by the rotation of the rotating shaft driven by the motor, or a structure capable of switching between opening and closing by manual adjustment instead of the motor.

Figure 2:
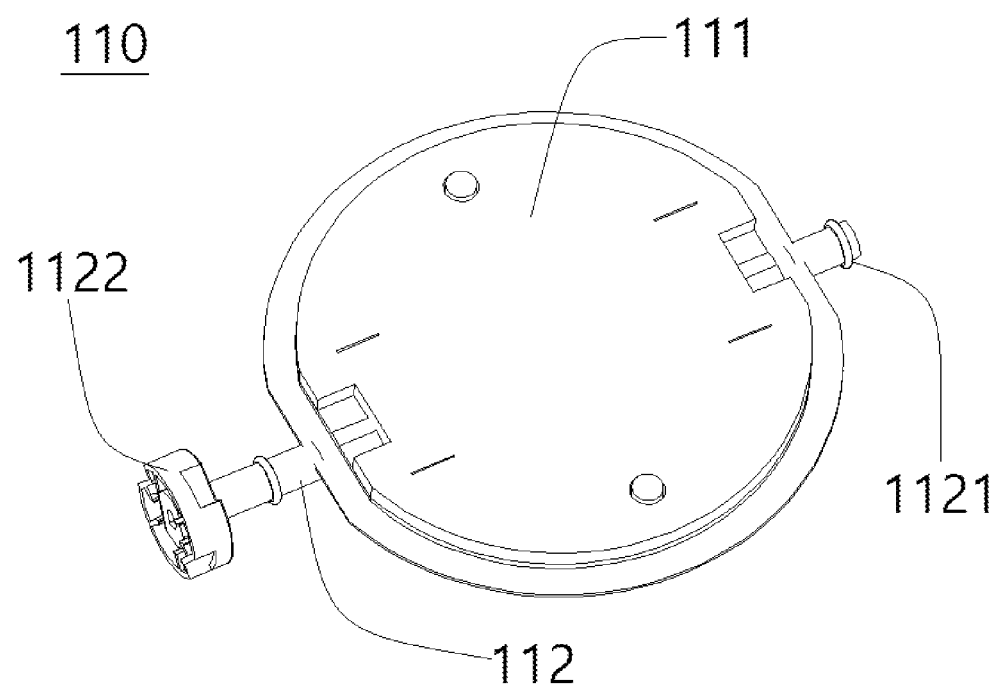
FIG. 2 is a schematic diagram showing a damper plate according to a first embodiment of the present application.
Figure 3:
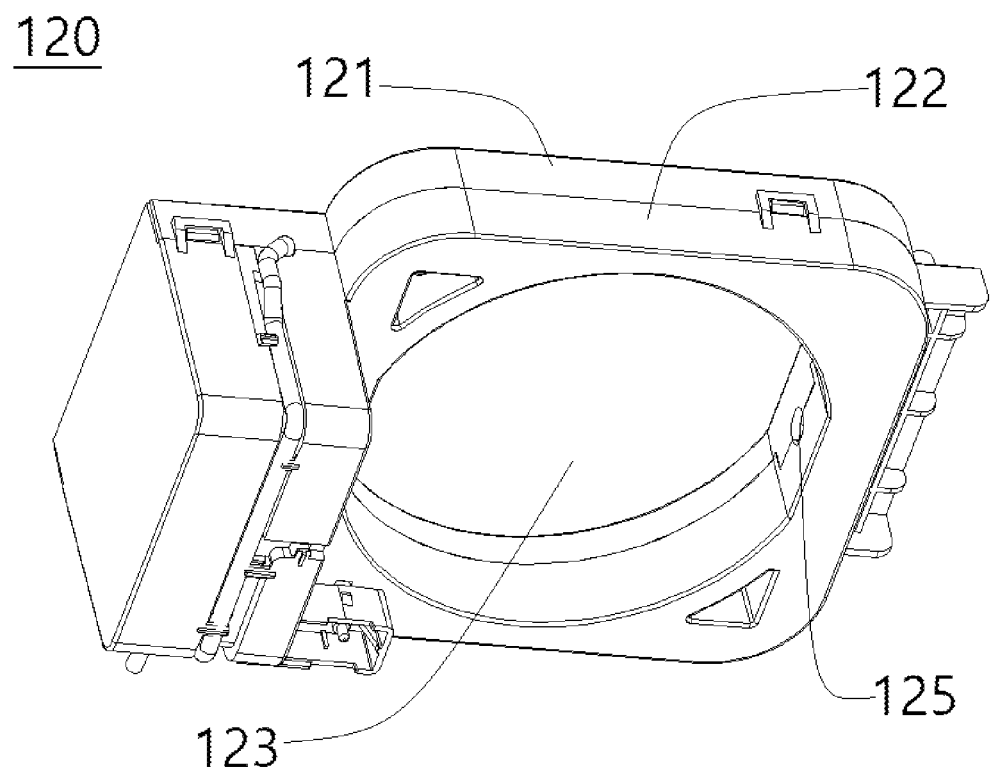
FIG. 3 is a schematic diagram showing a damper plate fixing base according to a first embodiment of the present application.
Figure 4:
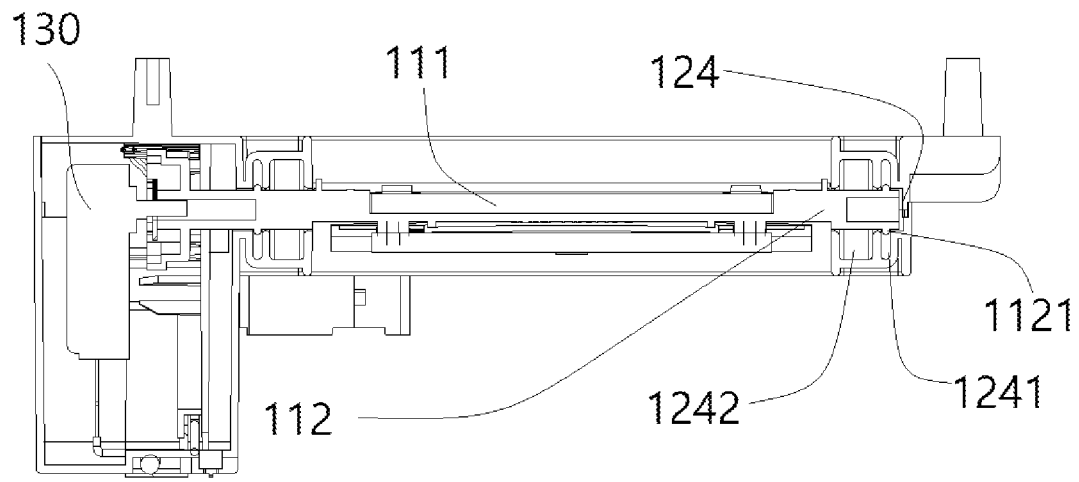
FIG. 4 is a side view showing a damper plate fixing base according to a first embodiment of the present application.
Figure 5:
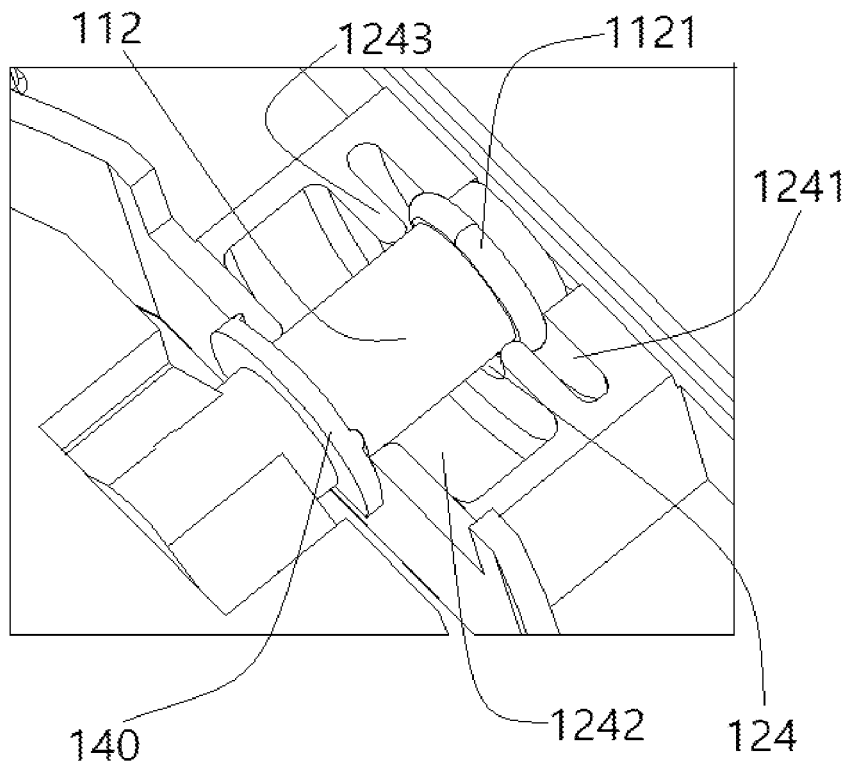
FIG. 5 is a partial schematic diagram showing a damper plate according to a first embodiment of the present application.
Figure 6:
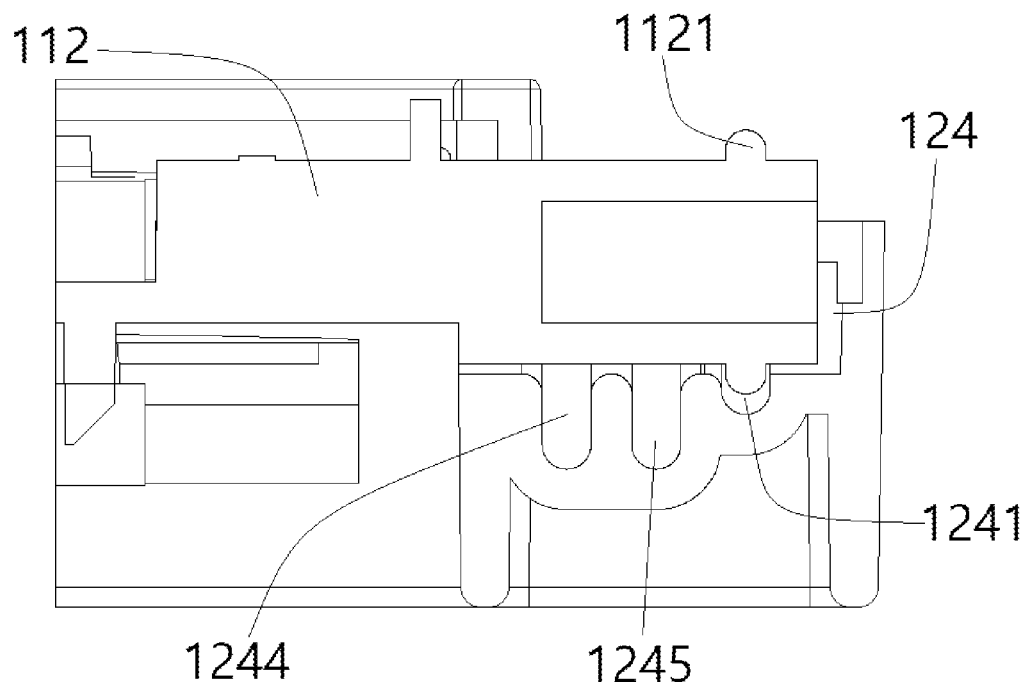
FIG. 6 is a partial side view showing a damper plate according to a second embodiment of the present application.
Figure 7:
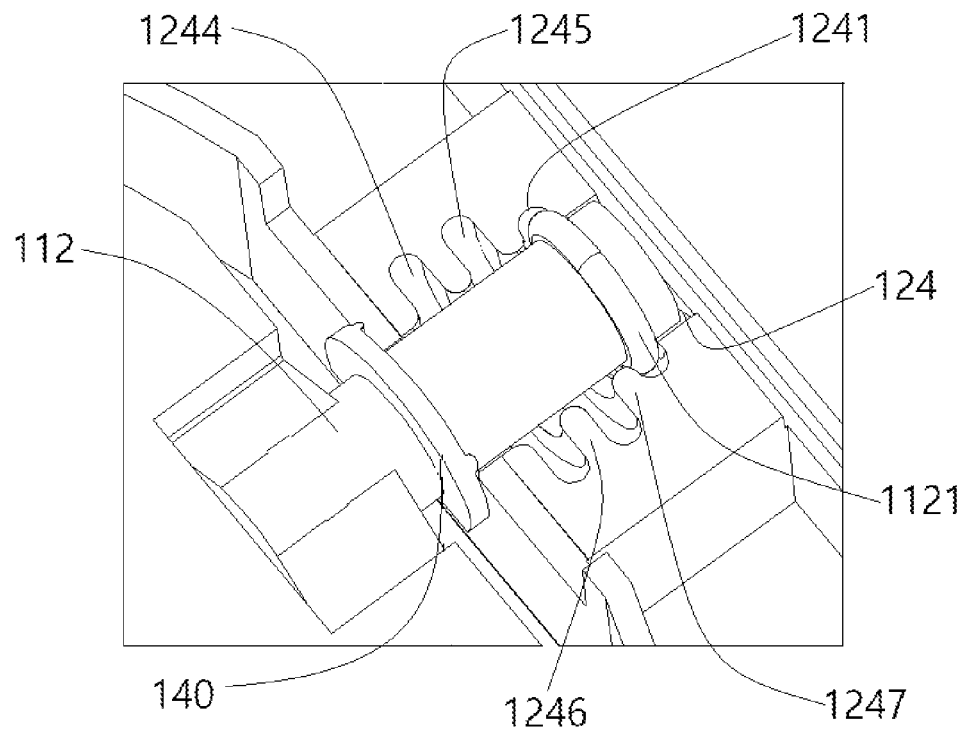
FIG. 7 is a partial schematic diagram showing a damper plate according to a second embodiment of the present application.
Figure 8:
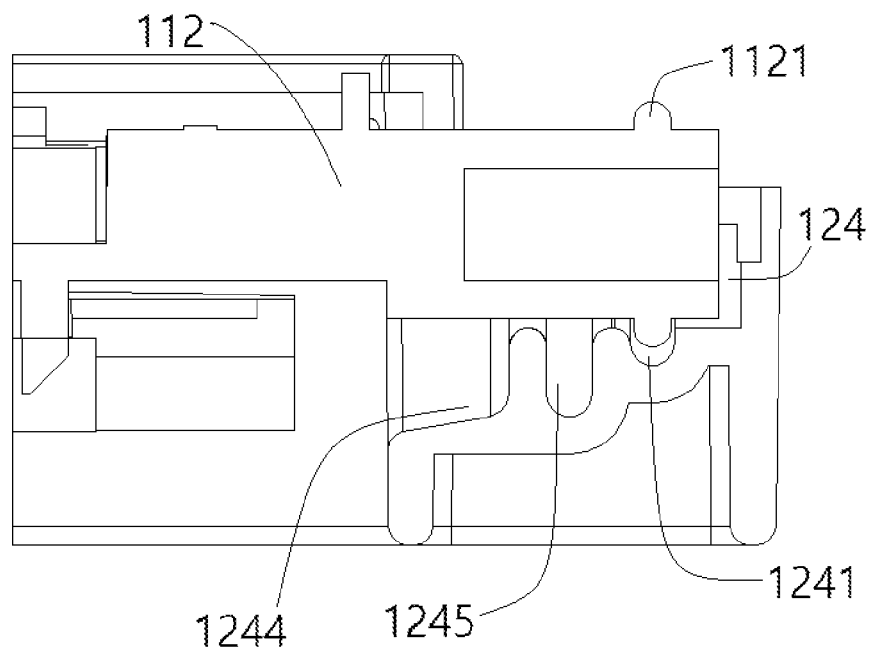
FIG. 8 is a partial side view showing a damper plate according to a third embodiment of the present application.
Figure 9:
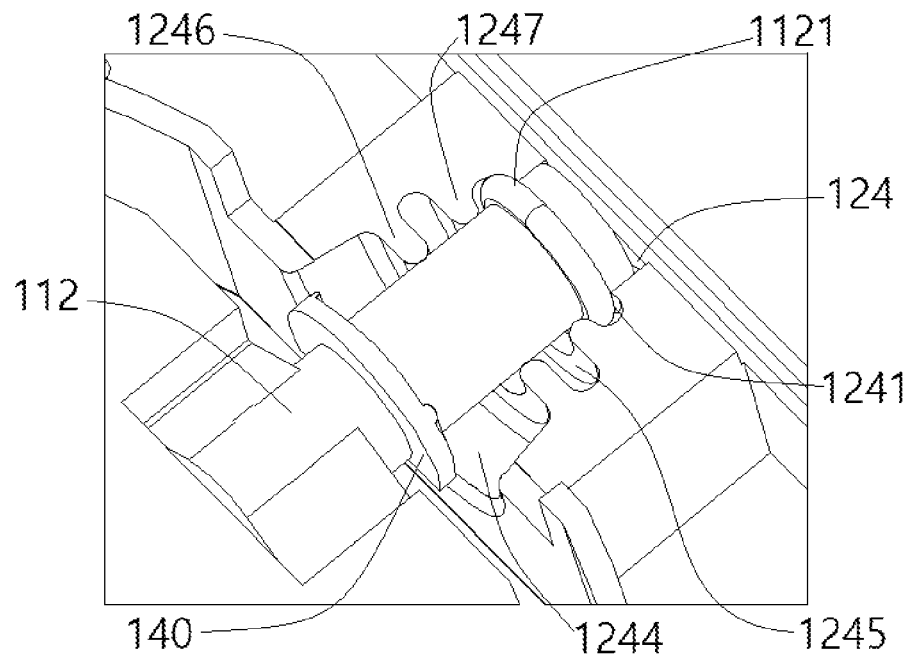
FIG. 9 is a partial schematic diagram showing a damper plate according to a third embodiment of the present application.
Figure 10:
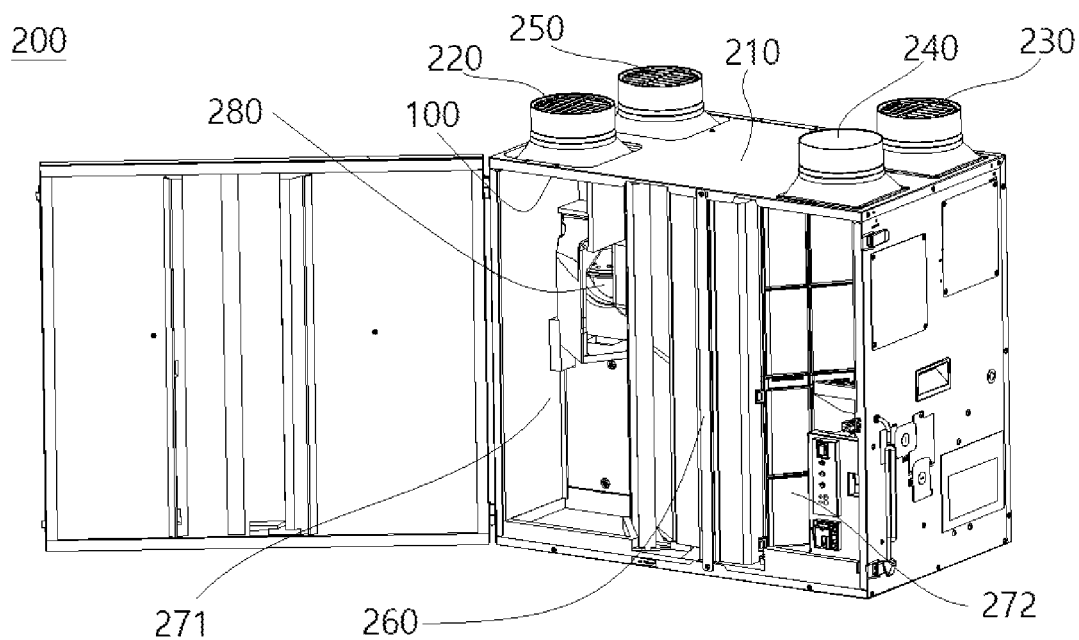
FIG. 10 is a schematic diagram showing a total heat exchanger according to a fourth embodiment of the present application.
Figure 11:
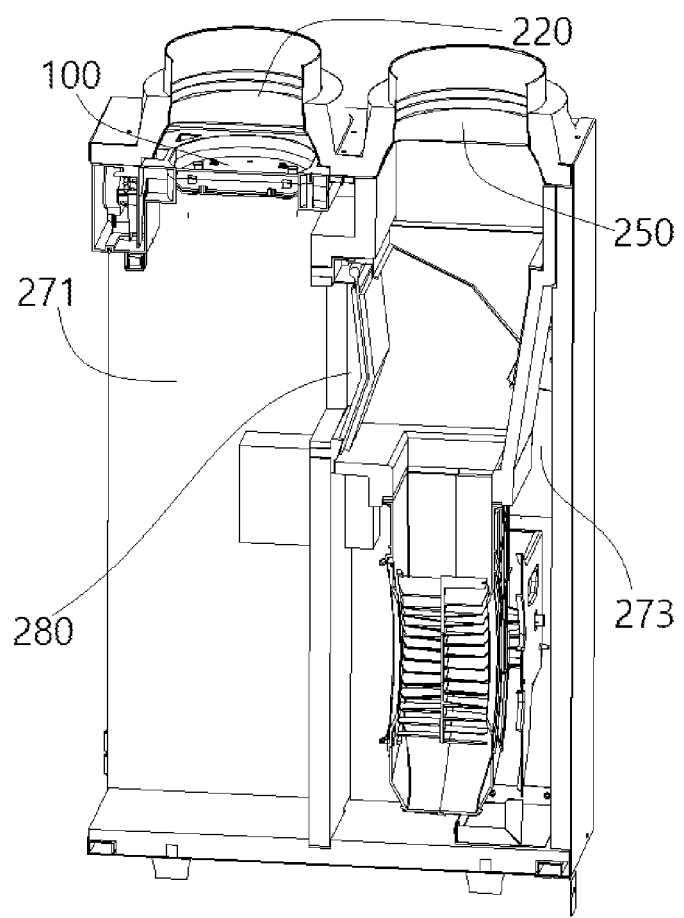
FIG. 11 is a cross-sectional schematic diagram showing a total heat exchanger according to a fourth embodiment of the present application.

Hereinafter, the embodiments according to the present application will be described in detail with reference to the accompanying drawings, in which FIG. 1 is a schematic diagram showing a damper device according to a first embodiment of the present application; FIG. 2 is a schematic diagram showing a damper plate according to a first embodiment of the present application; FIG. 3 is a schematic diagram showing a damper plate fixing base according to a first embodiment of the present application; FIG. 4 is a side view showing a damper plate fixing base according to a first embodiment of the present application; FIG. 5 is a partial schematic diagram showing a damper plate according to a first embodiment of the present application; FIG. 6 is a partial side view showing a damper plate according to a second embodiment of the present application; FIG. 7 is a partial schematic diagram showing a damper plate according to a second embodiment of the present application; FIG. 8 is a partial side view showing a damper plate according to a third embodiment of the present application; FIG. 9 is a partial schematic diagram showing a damper plate according to a third embodiment of the present application; FIG. 10 is a schematic diagram showing a total heat exchanger according to a fourth embodiment of the present application; and FIG. 11 is a cross-sectional schematic diagram showing a total heat exchanger according to a fourth embodiment of the present application.

As shown in FIG. 1, the damper device 100 according to the first embodiment of the present application includes: a damper plate 110, a damper plate fixing base 120 and a motor 130 for driving the damper plate 110.

The damper plate 110 covers one side of an air port. Specifically, the angle of the damper plate 110 can be changed to open and close the air port.

As shown in FIG. 2, the damper plate 110 may include an air port cover plate 111 and a rotating shaft 112. In an embodiment, the air port cover plate 111 according to the first embodiment of the present application has a shape of a circular plate, and rotates around the rotating shaft 112 described later to cover or open the air port. The rotating shaft 112 is connected to the air port cover plate 111. Specifically, the rotating shaft 112 is disposed on the air port cover plate 111 and extends along a diameter direction of the air port cover plate 111 and thus the air port cover plate 111 can rotate around the rotating shaft 112, thereby changing the angle of the air port cover plate 111. Alternatively, the rotating shaft 112 and the air port cover plate 111 in the present embodiment are integrally formed.

Further, the rotating shaft 112 may include protrusions 1121 and a connecting portion 1122. The protrusions 1121 are respectively formed at both ends of the rotating shaft 112 for positioning the rotating shaft 112. In the present embodiment, the protrusion 1121 has an annular shape protruding from a surface of the rotating shaft 112 to an outer circumference thereof. Alternatively, in addition to the annular shape, the protrusions may also be bumps, lumps, or consist of multiple bumps and lumps.

The connecting portion 1122 is formed at an end of the rotating shaft 112 proximal to the motor 130 and is configured to connect the rotating shaft 112 with the motor 130 described later. By connecting the motor 130 with the connecting portion 1122, the motor 130 can drive the rotating shaft 112 to rotate, thereby driving the rotary movement of the air port cover plate 111.

As shown in FIG. 3, the damper plate fixing base 120 according to the first embodiment of the present application is used to fix the damper plate 110. Specifically, the damper plate fixing base 120 has a hollow structure and may be formed by connecting an upper fixing bases 121 and a lower fixing base 122 opposite to each other together. Alternatively, in the present embodiment, after the rotating shaft 112 of the damper plate 110 is fixed on the lower fixing base 122, the upper fixing base 121 is engaged with the lower fixing base 122 to fix the damper plate 110 inside the damper plate fixing base 120.

Further, the damper plate fixing base 120 may include a mounting port 123 and a fixing groove 124.

The mounting port 123 is formed on a hollow part of the hollow structure of the damper plate fixing base 120 and has the same shape as the air port cover plate 111.

The fixing groove 124 is recessed and formed on a connecting surface of the upper fixing base 121 and the lower fixing base 122, and has a shape corresponding to the rotating shaft 112 to accommodate the rotating shaft 112. That is, the rotating shaft 112 is positioned by being clipped into the fixing groove 124, and the rotating shaft 112 rotates inside the fixed groove 124 when driven by the motor 130. The fixing groove 124 may include a protrusion-dedicated groove 1241 and a recess 1242. The protrusion-dedicated groove 1241 and the recess 1242 will be described in detail below.

The inserting port 125 is formed on an inner surface of the mounting port 123, that is, it may be partially formed on inner surfaces of hollow portions of the upper fixing base 121 and the lower fixing base 122, respectively, and combined to form a complete inserting port 125. The inserting port 125 is configured to guide the rotating shaft 112 to be inserted into the fixing groove 124.

Further, as shown in FIGS. 4 and 5, the fixing groove 124 may include a protrusion-dedicated groove 1241 and a recess 1242.

The protrusion-dedicated groove 1241 is configured to match the protrusion 1121 on the rotating shaft 112, and is formed at a position of the fixing groove 124 corresponding to the protrusion 1121. When the rotating shaft 112 rotates, the protrusion-dedicated groove 1241 forms a rotation path for the protrusion 1121, that is, the protrusion 1121 may only rotate along the protrusion-dedicated groove 1241. In the present embodiment, as described above, the protrusion 1121 has an annular shape surrounding an outer circumferential surface of the rotating shaft. Therefore, the protrusion-dedicated groove 1241 corresponds to the protrusion 1121, and an annular groove is formed around an outer circumference of the fixing groove 124.

In the present embodiment, when the rotating shaft rotates, the protrusion 1121 may rotate in the protrusion-dedicated groove 1241 without restriction, and thus the damper plate 110 may rotate by an angle of 360°. However, the present invention is not limited to this. When the user only needs to rotate the damper plate 110 by a predetermined angle such as 180°, the damper plate 110 may rotate by a predetermined angle by changing the shape of the protrusion 1121, and by changing a rotary path distance from the protrusion 1121, that is, a formation length of the protrusion-dedicated groove 1241. For example, when the user only needs the damper plate 110 to rotate by 180°, the protrusion 1121 may be formed as a annular shape or a bump surrounding only a part of the rotating shaft 112, and a protrusion-dedicated groove 1241 is formed as a semicircular shape corresponding to the protrusion 1121 from the outer circumference of the fixing groove 124 so that during the rotation of the rotating shaft, the protrusion 1121 correspondingly rotates along the protrusion-dedicated groove 1241 and cannot further rotate at both ends of the protrusion-dedicated groove 1241. Finally, the damper plate 110 may only rotate by 180°.

The recess 1242 is formed by being further recessed from the outer circumference of the fixing groove 124 and is disposed opposite to the rotating shaft 112. The recess 1242 in the present embodiment may have a annular shape and be disposed side by side with the protrusion-dedicated groove 1241. However, the present invention is not limited to this. The recess 1242 is configured to reduce the resistance between the rotating shaft 112 and the fixing groove 124. Therefore, the recess 1242 can also be formed by being further recessed from only a part of the outer circumference of the fixing groove 124 without completely enclosing the fixing groove 124. In the present embodiment, a retaining wall 1243 for separating the protrusion-dedicated groove 1241 and the recess 1242 is formed.

Similar to the above-mentioned inserting port 125, the fixing groove 124 according to the present embodiment can also have a part disposed on the upper fixing base 121 and another part disposed on the lower fixing base 122. After the upper fixing base 121 and the lower fixing base 122 are assembled, the fixing groove 124 composed of the protrusion-dedicated groove 1241, the recess 1242 and the retaining wall 1243 is disposed at the outer circumference of the rotating shaft 112 around the rotating shaft 112.

The motor 130 of the damper device 100 according to the present embodiment is connected to the damper plate 110. When the motor 130 is energized, the rotating shaft 112 of the damper device 100 is driven to rotate around the shaft of the motor 130, so that the damper plate 110 is rotated to change an angle thereof. Alternatively, the motor 130 may be a gear motor.

As shown in FIG. 4, the recess 1242 in the present embodiment is disposed at a position between the protrusion 1121 and the inserting port 125, but it can also be disposed at a position between the protrusion 1121 and the connecting portion 1122, or the recess 1242 may be disposed at a position between the protrusion 1121 and the inserting port 125 and a position between the protrusion 1121 and the connecting portion 1122. Since the recess 1242 is disposed, the contact area between the rotating shaft 112 and the fixing groove 124 is reduced, so that even if the water vapor attached to the rotating shaft 112 is iced, the rotating shaft 112 and the fixing groove 124 will not be connected together to increase a resistance to the rotation of the rotating shaft 112. In addition, a part of the water vapor attached to the rotating shaft 112 will drop into the recess 1242 when it condenses to a certain weight. When encountering cold air, the water vapor attached to the rotating shaft 112 is reduced, and thus the resistance to the rotation of the damper device is also decreased.

In addition, a retaining wall 1243 is formed between the recess 1242 and the protrusion-dedicated groove 1241, so that decreased amount of water vapor enters the fixing groove 124, the icing of the rotating shaft 112 is prevented, and the normal operation of the heat exchanger is ensured.

In addition, as shown in FIG. 5, the damper device 100 according to the present embodiment further includes a stopper 140 disposed outside the inserting port 125 and configured to cover the gap between the rotating shaft 112 and the inserting port 125. In order to allow the rotation of the rotating shaft 112, a certain gap is reserved between the rotating shaft 112 and the inserting port 125 of the fixing groove 124, so that water vapor will enter fixing groove 124 from the gap. The stopper 140 is disposed outside the inserting port 125 to further block the water vapor from entering the fixing groove 124, thereby further suppressing icing of the rotating shaft 112.

On the basis of the first embodiment, a second embodiment is further provided in the present application. As shown in FIG. 6 and FIG. 7, the difference between the second embodiment and the first embodiment is that two recesses are disposed. In the present embodiment, the recess includes a first recess 1244 and a second recess 1245, but the number of recesses in the second embodiment of the present application is not limited to this.

The second recess 1245 is disposed on a side proximal to the protrusion-dedicated groove 1241, and is disposed between the first recess 1244 and the protrusion-dedicated groove 1241. The first recess 1244 and the second recess 1245 are disposed side by side, that is, disposed along an axial direction of the rotating shaft 112. Although the first recess 1244 and the second recess 1245 in the present embodiment have the same size, the present application is not limited to this. The first recess 1244 may be larger than the second recess 1245, or the second recess 1245 may be larger than the first recess 1244. A first retaining wall 1246 is formed between the first recess 1244 and the second recess 1245, the second recess 1245 is disposed between the first recess 1244 and the protrusion-dedicated groove 1241, and the second retaining wall 1247 is formed between the second recess 1245 and the protrusion-dedicated groove 1241. In addition, two or more recesses may be disposed depending on the length of the rotating shaft 112. Similarly, when more recesses are disposed, more retaining walls will also be disposed with the increase in the recesses.

Since a first recess is disposed in the present embodiment, the contact area between the rotating shaft 112 and the fixing groove 124 may be decreased as in the first embodiment. Further, a second recess is added on this basis and a retaining wall is added between the first recess 1244 and the second recess 1245 to further prevent water vapor from entering the fixing groove 124, thereby further suppressing icing of the rotating shaft 112.

On the basis of the second embodiment, a third embodiment is further provided in the present application. In the third embodiment, the difference from the second embodiment is that the first recess 1244 communicates with the mounting port 123 of the damper plate fixing base 120, that is, the water dripping into the first recess 1244 will flow into the mounting port 123 of the damper plate fixing base 120, which may prevent water from accumulating in the recesses and further suppressing icing of the rotating shaft 112.

According to a fourth embodiment of the present application, a total heat exchanger 200 is provided, and the total heat exchanger 200 applies the damper device 100 in any of the foregoing embodiments according to the present application.

As shown in FIGS. 10 and 11, the total heat exchanger 200 according to the present embodiment may include a case 210, a heat exchange unit 260, an air-supply fan (not shown), and an exhaust fan (not shown).

The case 210 of the total heat exchanger 200 is provided with an air-supply air inlet 220, an air-supply air outlet 230, an exhaust air inlet 240, and an exhaust air outlet 250.

Specifically, the air-supply air inlet 220 is an opening that communicates an interior of the case with outdoor spaces through a pipeline to allow the outdoor air to enter the interior of the case. In a heat exchange mode, the air-supply air inlet 220 is opened, and in an internal circulation mode, the air-supply air inlet 220 is closed by disposing the above damper device 100.

The air-supply air outlet 230 is an opening that communicates the interior of the case with the indoor spaces through a pipeline to allow the indoor air to be blown out of the indoor spaces. In either the heat exchange mode or the internal circulation mode, the air-supply air inlet 220 is opened.

The exhaust air inlet 240 is an opening that communicates the interior of the case with the indoor spaces through a pipeline to allow the indoor air to be inhaled into the case. In either the heat exchange mode or the internal circulation mode, the exhaust air inlet 240 is opened.

The exhaust air outlet 250 is an opening that communicates the interior of the case with the outdoor spaces through a pipeline to allow the air inside the case to be blown out to the outdoor spaces. In the heat exchange mode, the exhaust air outlet 250 is opened, and in the internal circulation mode, the exhaust air outlet 250 is closed.

In addition, an interior of the case 210 is divided into at least four spaces which include an air-supply inflow space 271, an air-supply outflow space (not shown), an exhaust inflow space 272, and an exhaust outflow space 273. The air-supply inflow space 271, the air-supply outflow space, the exhaust inflow space 272 and the exhaust outflow space 273 are spaced from each other.

Specifically, the air-supply inflow space 271 communicates with the air-supply air inlet 220 and is a space optionally disposed on a front right side of the case 210. Specifically, the air-supply outflow space communicates with the air-supply air outlet 230 and is a space optionally disposed on a rear left side of the case 210. Specifically, the exhaust inflow space 272 communicates with the exhaust air inlet 240 and is a space optionally disposed on a front left side of the case 210. Specifically, the exhaust outflow space 273 communicates with the exhaust air outlet 250 and is a space optionally disposed on a rear right side of the case 210. The air-supply inflow space 271, the air-supply outflow space, the exhaust inflow space 272, and the exhaust outflow space 273 may have specific locations different from the present application, which is not limited in the present application.

Further, the heat exchange unit 260 is disposed inside the case 210. The heat exchange unit 260 is formed by sticking a plurality of thin plates together. The air from the air-supply air inlet 220 to the air-supply air outlet 230 and the air from the exhaust air inlet 240 to the exhaust air outlet 250 exchange heat in the heat exchange unit 260.

In addition, the total heat exchanger 200 may further include a circulation air port 280 and an air-supply fan (not shown).

The circulation air port 280 communicates with the air-supply inflow space 271 and the exhaust outflow space 273. The circulation air port 280 may be selectively opened or closed.

The air-supply fan is disposed inside the air-supply outflow space. The exhaust fan is disposed inside the exhaust outflow space 273. The air supply fan or the exhaust fan may include a motor, a snail case, and fan blades located inside the snail case. The fan blades are driven to rotate by the rotation of the motor to generate an air flow. For example, the fan blades may be multi-wing centrifugal fan blades.

The total heat exchanger 200 according to the present embodiment may perform a heat exchange mode and an internal circulation mode.

When the total heat exchanger 200 is in the heat exchange mode, the circulation air port 280 is closed, and the air-supply air outlet 230 and the air-supply air inlet 220 are opened. At this time, the air-supply fan and the exhaust fan are started, outdoor air entering the case 210 from the air-supply air inlet 220 and indoor air entering the case 210 from the exhaust air inlet 240 enter the heat exchange unit 260 respectively after passing through the dust collector disposed on the upstream side of the heat exchange unit 260, respectively and these two air flows exchange energy with each other at the heat exchange unit 260. After the energy is exchanged, the air is blown out from the air-supply air outlet 230 and the exhaust air outlet 250 to indoor and outdoor spaces, respectively.

When the total heat exchanger 200 is in the internal circulation mode, the circulation air port 280 is opened, and the exhaust air outlet 250 and the air-supply air inlet 220 are closed. The air-supply fan and the exhaust fan are started, indoor air entering the case 210 through the exhaust air inlet 240 passes through the heat exchange unit 260, enters the exhaust outflow space 273, and then enters the air-supply inflow space 271 through the circulation air port 280, and is discharged into the indoor spaces through the air-supply air outlet 230 after entering the heat exchange unit 260 again, thereby realizing indoor air circulation.

The total heat exchanger 200 in the present embodiment automatically switches between the heat exchange mode and the internal circulation mode with the help of an indoor temperature sensor. When the heat exchange mode of the total heat exchanger 200 is turned on, the damper plate 110 disposed on the downstream side of the air-supply air inlet 220 is opened, and the outdoor cold air enters the air-supply inflow space 271, and the air-supply inflow space 271 is filled with cold air. The internal circulation mode is turned on after the heat exchange mode. At this time, the indoor hot and humid air enters the air-supply inflow space 271 through the circulation air port 280, and the hot and humid air forms water vapor when it is cooled and is attached to the damper device 100 in the air-supply inflow space 271. When the internal circulation mode is turned off and the heat exchange mode is turned on again, the outdoor cold air enters the air-supply inflow space 271 again. At this time, the water vapor attached to the damper plate 110 will be condensed into ice.

Since the damper plate 110 applied to the total heat exchanger 200 has a large size, the length of the rotating shaft 112 will increase accordingly. If ice is formed on the rotating shaft 112, the icing area will be larger, which will increase the resistance to the rotation of the damper plate 110. When the resistance is greater than the torque of the motor, the damper plate 110 cannot be opened, which affects the operation of the total heat exchanger 200. Therefore, in the prior art, the air volume is generally decreased to deal with the low temperature problem. After the air volume is decreased, the speed of the cold air entering the air-supply inflow space 271 is reduced, so that the water vapor attached to the rotating shaft 112 is not easy to be iced. However, the present embodiment is provided with a recess that is opposite to the rotating shaft 112 and is further recessed from the outer circumference of the fixing groove 124, so that the contact area between the rotating shaft 112 and the fixing groove 124 is reduced, and the resistance to the rotation of the rotating shaft 112 is reduced. Therefore, even if the air volume is not decreased, the rotating shaft 112 can still rotate, so as to ensure the normal operation of the damper device 110.

So far, the embodiments of the present application have been described in detail in conjunction with the drawings. Based on the above description, those skilled in the art should have a clear understanding of the present application.

It should be noted that, the implementation manners that are not shown or described in the drawings or the specification may be forms known to those of ordinary skill in the art, which are not described in detail. In addition, the above definition of components is not limited to the various specific structures and shapes mentioned in the embodiments, and those of ordinary skill in the art can simply modify or replace them.

In addition, the damper device can also be a fresh air product such as a blower in addition to being applied to a total heat exchanger. The objectives, technical solutions and beneficial effects of the present application are described in further detail in the specific embodiments described above. It should be understood that the above descriptions are only specific embodiments of the present application and are not intended to limit the present application. Any modification, equivalent replacement, improvement and the like made within the principle of the present application shall be included in the protection scope of the present application.

What is claimed is:
1. A total heat exchanger, comprising:
a case in which an air-supply inflow space, an exhaust inflow space, an air-supply outflow space and an exhaust outflow space are provided to be separated from each other;
an air-supply air inlet provided on the case and configured to communicate with the air-supply inflow space and allow outdoor air to enter the case;
an air-supply air outlet provided on the case and configured to communicate with the air-supply outflow space and allow air entering the case to be blown out into indoor spaces;
an air-supply air fan disposed inside the case and configured to guide the air from the air-supply air inlet into the case and to be blown toward the air-supply air outlet;

an exhaust air inlet provided on the case and configured to communicate with the exhaust inflow space and allow indoor air to enter the case;

an exhaust air outlet provided on the case and configured to communicate with the exhaust outflow space and allow the air entering the case to be blown out into outdoor spaces;

an exhaust air fan disposed inside the case and configured to guide the air from the exhaust air inlet into the case and to be blown toward the exhaust air outlet;

a heat exchange unit disposed in the case, wherein the air-supply inflow space and the air-supply outflow space communicate with each other through the heat exchange unit to form an air-supply air path, the exhaust inflow space and the exhaust outflow space communicate with each other through the heat exchange unit to form an exhaust air path, and the air-supply air path and the exhaust air path exchange heat when passing through the heat exchange unit; and a damper device disposed at the air-supply air inlet, wherein the damper device comprises:

a damper plate comprising an air port cover plate, and a rotating shaft disposed on the air port cover plate and extending along a diameter direction of the air port cover plate; and a damper plate fixing base configured to fix the damper plate therein, wherein the damper plate fixing base comprises a fixing groove facing the rotating shaft and configured to fix the rotating shaft, and the fixing groove comprises a recess disposed facing the rotating shaft and formed by a further recess from at least a part of an outer circumference of the fixing groove.

2. The total heat exchanger of claim 1, wherein:

the damper plate fixing base has a hollow structure, and a hollow portion of the damper plate fixing base is formed with a mounting port for disposing of liquid from the air port cover plate, and the fixing groove communicates with the mounting port.

3. The total heat exchanger of claim 2, wherein:

the rotating shaft comprises a protrusion disposed on an end of the rotating shaft, the fixing groove further comprises a protrusion-dedicated groove matching with the protrusion, and the protrusion rotates in the protrusion-dedicated groove when the rotating shaft rotates in the fixing groove.

4. The total heat exchanger of claim 3, wherein the recess communicates with the mounting port.

5. The total heat exchanger of claim 4, wherein:

two or more recesses are provided along an extension direction of the rotating shaft, a first retaining wall is provided between adjacent recesses, and a second retaining wall is provided between the groove and the protrusion-dedicated groove.

6. The total heat exchanger of claim 3, wherein:

two or more recesses are provided along an extension direction of the rotating shaft, a first retaining wall is provided between adjacent recesses, and a second retaining wall is provided between the groove and the protrusion-dedicated groove.

7. The total heat exchanger of claim 3, wherein:

the protrusion is provided to surround an outer circumferential surface of the rotating shaft so as to form an annular shape, or the protrusion is provided with one or more lumps or bumps on a part of the outer circumferential surface of the rotating shaft.

8. The total heat exchanger of claim 2, wherein the damper device further comprising an inserting port provided on an inner surface of the mounting port and configured to guide the rotating shaft to be inserted into the fixing groove.

9. The total heat exchanger of claim 8, wherein the damper device further comprises a stopper disposed outside the inserting port and covering a gap between the rotating shaft and the inserting port.

10. The total heat exchanger of claim 2, wherein:

the damper plate fixing base comprises an upper fixing base and a lower fixing base facing and connected to each other, and the fixing groove is formed by being recessed on a connecting surface between the upper fixing base and the lower fixing base.

* * * * *